(12) United States Patent
Chen et al.

(10) Patent No.: US 11,800,545 B2
(45) Date of Patent: Oct. 24, 2023

(54) CONTROL METHOD AND TERMINAL

(71) Applicant: VIVO MOBILE COMMUNICATION CO.,LTD., Guangdong (CN)

(72) Inventors: Li Chen, Dongguan (CN); Yue Ma, Dongguan (CN); Zichao Ji, Dongguan (CN); Peng Sun, Dongguan (CN)

(73) Assignee: VIVO MOBILE COMMUNICATION CO., LTD., Dongguan (CN)

(*) Notice: Subject to any disclaimer, the term of this patent is extended or adjusted under 35 U.S.C. 154(b) by 4 days.

(21) Appl. No.: 17/069,632

(22) Filed: Oct. 13, 2020

(65) Prior Publication Data

US 2021/0029712 A1 Jan. 28, 2021

Related U.S. Application Data

(63) Continuation of application No. PCT/CN2019/081897, filed on Apr. 9, 2019.

(30) Foreign Application Priority Data

Apr. 13, 2018 (CN) .......................... 201810331802.9

(51) Int. Cl.
*H04W 72/53* (2023.01)
*H04W 76/19* (2018.01)
*H04W 76/27* (2018.01)
*H04W 36/00* (2009.01)
*H04W 72/044* (2023.01)

(52) U.S. Cl.
CPC ....... *H04W 72/53* (2023.01); *H04W 36/0066* (2013.01); *H04W 72/046* (2013.01); *H04W 76/19* (2018.02); *H04W 76/27* (2018.02)

(58) Field of Classification Search
None
See application file for complete search history.

(56) References Cited

U.S. PATENT DOCUMENTS

| | | |
|---|---|---|
| 2013/0301549 A1 | 11/2013 | Chen et al. |
| 2014/0233541 A1 | 8/2014 | Kim et al. |
| 2015/0373626 A1 | 12/2015 | Yi et al. |
| 2018/0192383 A1 | 7/2018 | Nam et al. |
| 2018/0212736 A1 | 7/2018 | Chatterjee et al. |
| 2018/0279135 A1 | 9/2018 | Hwang et al. |

(Continued)

FOREIGN PATENT DOCUMENTS

| | | |
|---|---|---|
| CN | 102282869 A | 12/2011 |
| CN | 103973412 A | 8/2014 |

(Continued)

OTHER PUBLICATIONS

Korean Office Action dated Jun. 7, 2021 as received in application No. 10-2020-7032857.

(Continued)

*Primary Examiner* — Jutai Kao
(74) *Attorney, Agent, or Firm* — Maschoff Brennan

(57) ABSTRACT

A control method and a terminal are provided. The control method includes: acquiring dedicated RRC information and/or system information; performing a control operation on a CORESET and/or CSS according to information carried in the dedicated RRC information and/or system information, wherein the information is related to the CORESET and/or CSS.

17 Claims, 2 Drawing Sheets

Acquiring dedicated RRC information and/or system information — 101

Performing a control operation on a CORESET and/or CSS according to information carried in the dedicated RRC information and/or system information — 102

(56) References Cited

U.S. PATENT DOCUMENTS

| | | | |
|---|---|---|---|
| 2019/0021119 A1* | 1/2019 | Ng | H04W 48/10 |
| 2019/0281539 A1 | 9/2019 | Takeda et al. | |
| 2020/0221428 A1* | 7/2020 | Moon | H04L 1/1854 |
| 2020/0374960 A1* | 11/2020 | Deenoo | H04W 72/14 |
| 2020/0389917 A1* | 12/2020 | Kwak | H04W 74/006 |
| 2021/0022124 A1* | 1/2021 | Miao | H04W 72/04 |
| 2021/0028979 A1 | 1/2021 | Takeda et al. | |
| 2021/0037505 A1* | 2/2021 | Kim | H04L 1/0002 |
| 2021/0185683 A1* | 6/2021 | Reial | H04W 72/042 |
| 2021/0250892 A1* | 8/2021 | Kim | H04L 5/0051 |
| 2022/0248291 A1* | 8/2022 | Park | H04W 36/30 |

FOREIGN PATENT DOCUMENTS

| | | |
|---|---|---|
| CN | 104144468 A | 11/2014 |
| CN | 104303440 A | 1/2015 |
| CN | 105027626 A | 11/2015 |
| CN | 105578597 A | 5/2016 |
| CN | 107404365 A | 11/2017 |
| CN | 107852292 A | 3/2018 |
| CN | 107872888 A | 4/2018 |
| JP | 2020-504971 A | 2/2020 |
| WO | 2015/064728 A1 | 5/2015 |
| WO | 2018/062455 A1 | 7/2019 |
| WO | 2019/175989 A1 | 2/2021 |

OTHER PUBLICATIONS

"Summary of Beam Mgmt." 3GPP TSG RAN WG1 Meeting #91, R1 172 1640, Reno, USA, Nov. 27-Dec. 1, 2017. Qualcomm.

European Search Report dated May 3, 2021 as received in application No. 19786221.2.

"Correction on 38.331 for CORESET and CSS" 3GPP TSG-RAN WG2 meeting #101bis, R2-1805215, Sanya, China, Apr. 16-20, 2018. Vivo.

"Misalignment of CSS in PBCH and dedicated signaling" 3GPP TSG-RAN WG2 Meeting #101bis, R2-1804882, Sanya China, Apr. 16-20, 2018, VIVO.

CN Office Action in Application No. 201810331802.9 dated Dec. 3, 2020.

Written Opinion and International Search Report in Application No. PCT/CN2019/081897 dated Oct. 22, 2020.

NTT Docomo, Inc., "Offline summary for AI 7.3.1.2 Remaining details on search space," 3GPP TSG RAN WG1 Meeting 91, R1-1721414, pp. 1-24, (Nov. 28, 2017).

JP Office Action dated Dec. 7, 2021 as received in Application No. 2020-556250.

\* cited by examiner

CONTROL METHOD AND TERMINAL

CROSS-REFERENCE TO RELATED APPLICATION

The present application is a continuation application of PCT Application No. PCT/CN2019/081897 filed on Apr. 9, 2019, which claims a priority to Chinese Patent Application No. 201810331802.9 filed in China on Apr. 13, 2018, disclosure of which are incorporated in their entirety by reference herein.

TECHNICAL FIELD

The present disclosure relates to the field of communication technology, and in particular to a control method and a terminal.

BACKGROUND

Conventionally, a network side may configure a control resource set (CORESET) #0 and a common search space (CSS) #0 for a terminal by using a master information block (MIB). If a CORESET #0 and/or CSS #0 is indicated in a dedicated radio resource control (RRC) message, then it is directed to the CORESET #0 and/or CSS #0 indicated in a MIB.

With the development of communication technology, a network side may configure a plurality of CORESETs and/or CSSs for a terminal. The plurality of CORESETs and/or CSSs usually need to be activated by a medium access control (MAC) control element (CE) before they can be used for corresponding beams. However, if, in a communication procedure such as a random access procedure, the plurality of CORESETs and/or CSSs have not been activated or a CORESET #0 and/or CSS #0 indicated in a MIB is inconsistent with that indicated in dedicated RRC information, the terminal may fail to accurately find a corresponding CORESET and/or CSS to complete a corresponding communication procedure, because at present how to select a CORESET and/or CSS for such a case has not been specified.

SUMMARY

In a first aspect, an embodiment of the present disclosure provides a control method. The method is applied to a terminal, and includes:
  acquiring dedicated RRC information and/or system information; and
  performing a control operation on a CORESET and/or CSS according to information carried in the dedicated RRC information and/or system information,
  wherein the information is related to the CORESET and/or CSS.

In a second aspect, an embodiment of the present disclosure further provides a terminal. The terminal includes:
  an acquisition module, configured to acquire dedicated RRC information and/or system information; and
  a control module, configured to perform a control operation on a CORESET and/or CSS according to information carried in the dedicated RRC information and/or system information,
  wherein the information is related to the CORESET and/or CSS.

In a third aspect, an embodiment of the present disclosure further provides a terminal, including: a memory, a processor, and a computer program stored in the memory and configured to be executed by the processor, wherein the processor is configured to execute the computer program to implement the steps in the foregoing control method.

In a fourth aspect, an embodiment of the present disclosure further provides a computer-readable storage medium storing therein a computer program, where the computer program is configured to be executed by a processor, to implement the steps in the foregoing control method.

BRIEF DESCRIPTION OF THE DRAWINGS

To describe the technical solutions of the embodiments of the present disclosure more clearly, the following briefly describes the accompanying drawings required for describing the embodiments of the present disclosure. Apparently, the accompanying drawings in the following description show only some embodiments of the present disclosure, and a person of ordinary skill in the art may still derive other drawings from these accompanying drawings without creative efforts.

DETAILED DESCRIPTION

To describe the technical solutions of the embodiments of the present disclosure more clearly, the following briefly describes the accompanying drawings required for describing the embodiments of the present disclosure. Apparently, the accompanying drawings in the following description show only some embodiments of the present disclosure, and a person of ordinary skill in the art may still derive other drawings from these accompanying drawings without creative efforts.

Figure 1:
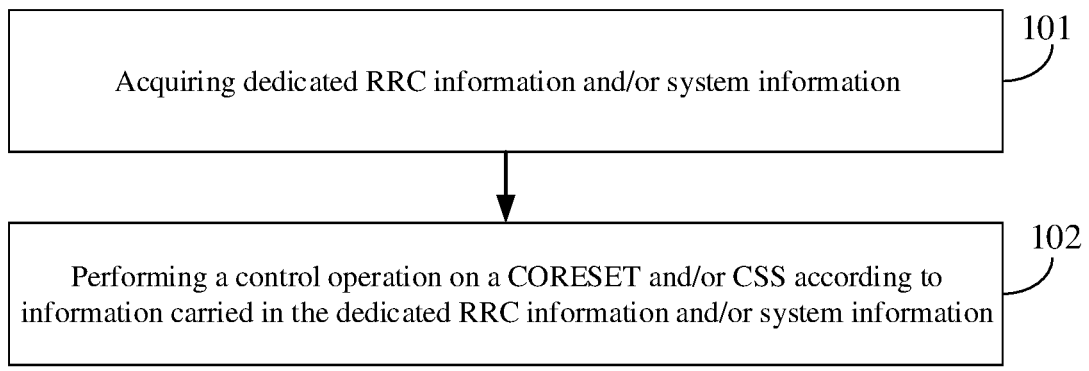
FIG. 1 is a flowchart of a control method according to an embodiment of the present disclosure.

Referring to FIG. 1, an embodiment of the present disclosure provides a control method. The method is applied to a terminal, and includes the following steps.

A step 101: acquiring dedicated RRC information and/or system information.

In the embodiment of the present disclosure, the dedicated RRC information may correspond to a target communication procedure. The target communication procedure may include at least one of the following: a handover procedure, a reconfiguration procedure, a reestablishment procedure, a secondary cell group change procedure, a secondary cell group addition procedure, a secondary cell group reconfiguration procedure, a secondary node change procedure, a secondary node addition procedure, a secondary node reconfiguration procedure, and the like. The system information may be a MIB or a system information block 1 (SIB1).

A step 102: performing a control operation on a CORESET and/or CSS according to information carried in the dedicated RRC information and/or system information.

The information is related to the CORESET and/or CSS.

In the control method in the embodiment of the present disclosure, it is specified that a control operation is performed on a CORESET and/or CSS according to information carried in dedicated RRC information and/or system information, wherein the information is related to the CORESET and/or CSS, so that a terminal can accurately find a corresponding CORESET and/or CSS to complete a corresponding communication procedure.

In an embodiment of the present disclosure, when the system information carries CORESET information and/or CSS information, a process of performing the control operation on the CORESET and/or CSS may include at least one of the following:

selecting a CORESET #0 indicated in the system information (for example, a MIB or a SIB1);

selecting a CSS #0 indicated in the system information (for example, a MIB or a SIB1);

selecting a CSS associated with a CORESET #0 indicated in the system information (for example, a MIB or a SIB1), wherein the association may be that the CORESET #0 and the CSS have a correspondence, or the CORESET #0 and the CSS have a quasi co-location (QCL) relationship available for reference.

In an embodiment of the present disclosure, when the dedicated RRC information corresponds to a target communication procedure and the dedicated RRC information carries configuration information used for indicating a beam of the CORESET and/or CSS, a process of performing the control operation on the CORESET and/or CSS may include at least one of the following:

selecting a CORESET #0 indicated in the system information (for example, a MIB or a SIB1);

selecting a CSS #0 indicated in the system information (for example, a MIB or a SIB1);

selecting a CSS associated with a CORESET #0 indicated in the system information (for example, a MIB or a SIB1), where the association may be that the CORESET #0 and the CSS have a correspondence, or the CORESET #0 and the CSS have a QCL relationship available for reference;

selecting a CORESET indicated in the dedicated RRC information;

selecting a CSS indicated in the dedicated RRC information; or selecting a CSS associated with a CORESET indicated in the dedicated RRC information, wherein the association may be that the CORESET and the CSS have a correspondence, or the CORESET and the CSS have a QCL relationship available for reference.

In an embodiment of the present disclosure, when the dedicated RRC information corresponds to a target communication procedure and the dedicated RRC information does not carry configuration information used for indicating a beam of the CORESET and/or CSS, a process of performing the control operation on the CORESET and/or CSS may include at least one of the following:

selecting a CORESET #0 indicated in the system information (for example, a MIB or a SIB1);

selecting a CSS #0 indicated in the system information (for example, a MIB or a SIB1);

selecting a CSS associated with a CORESET #0 indicated in the system information (for example, a MIB or a SIB1), where the association may be that the CORESET #0 and the CSS have a correspondence, or the CORESET #0 and the CSS have a QCL relationship available for reference;

selecting a CORESET #0 indicated in the dedicated RRC information;

selecting a CSS #0 indicated in the dedicated RRC information;

selecting a CSS associated with a CORESET #0 indicated in the dedicated RRC information, wherein the association may be that the CORESET #0 and the CSS have a correspondence, or the CORESET #0 and the CSS have a QCL relationship available for reference;

selecting a CORESET indicated in the dedicated RRC information;

selecting a CSS indicated in the dedicated RRC information;

selecting a CSS associated with a CORESET indicated in the dedicated RRC information, wherein the association may be that the CORESET and the CSS have a correspondence, or the CORESET and the CSS have a QCL relationship available for reference.

In an embodiment of the present disclosure, to deal with a case in which a CORESET and/or CSS indicated in a MIB may conflict with a CORESET and/or CSS indicated in a SIB1 or a CORESET and/or CSS indicated in system information may conflict with a CORESET and/or CSS indicated in dedicated RRC information, when both the MIB and the SIB1 carry CORESET information and/or CSS information or both the system information and the dedicated RRC information carry CORESET information and/or CSS information, a terminal may selectively ignore the CORESET information or CSS information.

Specifically, when the MIB carries CORESET information and/or CSS information and the SIB1 carries CORESET information and/or CSS information, a process of performing the control operation on the CORESET and/or CSS may include at least one of the following:

ignoring the CORESET information carried in the SIB1;

ignoring the CSS information carried in the SIB1;

ignoring the CORESET information carried in the MIB;

ignoring the CS S information carried in the MIB.

It needs to be noted that the CORESET information and/or CSS information may be carried explicitly and/or carried implicitly. That the CORESET information and/or CSS information is carried explicitly may refer to that corresponding information is included in information element (IE) content of the MIB and/or the SIB1. That the CORESET information and/or CSS information is carried implicitly may refer to that corresponding CORESET and CSS configuration information may be derived from bits carried in the physical broadcast channel (PBCH) (MIB) and/or SIB.

Specifically, when the dedicated RRC information carries CORESET information and/or CSS information and the system information (for example, a MIB and/or a SIB1) carries CORESET information and/or CSS information, a process of performing the control operation on the CORESET and/or CSS may include at least one of the following:

ignoring the CORESET information carried in the dedicated RRC information;

ignoring the CSS information carried in the dedicated RRC information;

ignoring the CORESET information carried in the system information; or ignoring the CSS information carried in the system information.

It needs to be noted that the dedicated RRC information is, for example, reconfiguration information, reconfiguration with sync information, configuration information, a handover (HO) command, mobility control information or the like. The CORESET information and/or CSS information may be carried explicitly and/or carried implicitly. That the CORESET information and/or CSS information is carried explicitly may refer to that corresponding information is included in IE content of the system information and/or the dedicated RRC information. That the CORESET information and/or CSS information is carried implicitly may refer to that corresponding CORESET and CSS configuration information may be derived from bits carried in the PBCH (MIB) and/or SIB.

It may be understood that the control method in embodiments of the present disclosure may be applied to $5^{th}$ generation (5G), evolved Long Term Evolution (eLTE) or other scenarios with similar configurations.

The control method in the present disclosure is described in the foregoing embodiments. A terminal corresponding to the control method of the present disclosure is described below with reference to the embodiments and the accompanying drawings.

Figure 2:
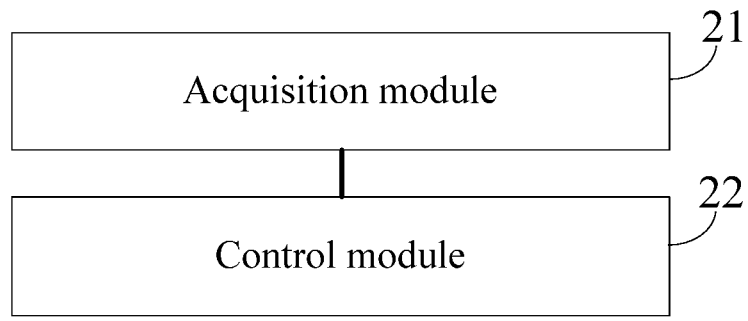
FIG. 2 is a first schematic structural diagram of a terminal according to an embodiment of the present disclosure.

Referring to FIG. 2, an embodiment of the present disclosure further provides a terminal. The terminal includes an acquisition module 21 and a control module 22. Details are described below.

The acquisition module 21 is configured to acquire dedicated RRC information and/or system information.

The control module 22 is configured to perform a control operation on a CORESET and/or CSS according to information carried in the dedicated RRC information and/or system information.

The information is related to the CORESET and/or CSS.

In the terminal according to the embodiment of the present disclosure, it is specified that a control operation is performed on a CORESET and/or CSS according to information carried in dedicated RRC information and/or system information, wherein the information is related to the CORESET and/or CSS, so that the terminal can accurately find a corresponding CORESET and/or CSS to complete a corresponding communication procedure.

In the embodiment of the present disclosure, optionally, the system information carries CORESET information and/or CSS information, and the control module 22 is specifically configured to perform at least one of the following:
  selecting a CORESET #0 indicated in the system information;
  selecting a CSS #0 indicated in the system information;
  selecting a CSS associated with a CORESET #0 indicated in the system information.

Optionally, the dedicated RRC information corresponds to a target communication procedure, and the dedicated RRC information carries configuration information used for indicating a beam of the CORESET and/or CSS; and the control module 22 is specifically configured to perform at least one of the following:
  selecting a CORESET #0 indicated in the system information;
  selecting a CSS #0 indicated in the system information;
  selecting a CSS associated with a CORESET #0 indicated in the system information;
  selecting a CORESET indicated in the dedicated RRC information;
  selecting a CSS indicated in the dedicated RRC information;
  selecting a CSS associated with a CORESET indicated in the dedicated RRC information.

Optionally, the dedicated RRC information corresponds to a target communication procedure, and the dedicated RRC information does not carry configuration information used for indicating a beam of the CORESET and/or CSS; and the control module 22 is specifically configured to perform at least one of the following:
  selecting a CORESET #0 indicated in the system information;
  selecting a CSS #0 indicated in the system information;
  selecting a CSS associated with a CORESET #0 indicated in the system information;
  selecting a CORESET #0 indicated in the dedicated RRC information;
  selecting a CSS #0 indicated in the dedicated RRC information;
  selecting a CSS associated with a CORESET #0 indicated in the dedicated RRC information;
  selecting a CORESET indicated in the dedicated RRC information;
  selecting a CSS indicated in the dedicated RRC information;
  selecting a CSS associated with a CORESET indicated in the dedicated RRC information.

Optionally, the target communication procedure includes at least one of the following:
  a handover procedure, a reconfiguration procedure, a reestablishment procedure, a secondary cell group change procedure, a secondary cell group addition procedure, a secondary cell group reconfiguration procedure, a secondary node change procedure, a secondary node addition procedure, and a secondary node reconfiguration procedure.

Optionally, the system information includes a MIB and a SIB1, the MIB carries CORESET information and/or CSS information, and the SIB1 carries CORESET information and/or CSS information; and the control module 22 is specifically configured to perform at least one of the following:
  ignoring the CORESET information carried in the SIB1;
  ignoring the CSS information carried in the SIB1;
  ignoring the CORESET information carried in the MIB;
  ignoring the CS S information carried in the MIB.

Optionally, the dedicated RRC information carries CORESET information and/or CSS information, and the system information carries CORESET information and/or CSS information; and the control module 22 is specifically configured to perform at least one of the following:
  ignoring the CORESET information carried in the dedicated RRC information;
  ignoring the CSS information carried in the dedicated RRC information;
  ignoring the CORESET information carried in the system information;
  ignoring the CSS information carried in the system information.

Optionally, the CORESET information and/or CSS information is carried explicitly and/or carried implicitly.

An embodiment of the present disclosure further provides a terminal, including a processor, a memory, and a computer program stored in the memory and executable on the processor. The processor is configured to execute the computer program to implement various processes in the embodiments of the foregoing control method, and can achieve the same technical effects. To avoid repetition, details are not described herein again.

Figure 3:
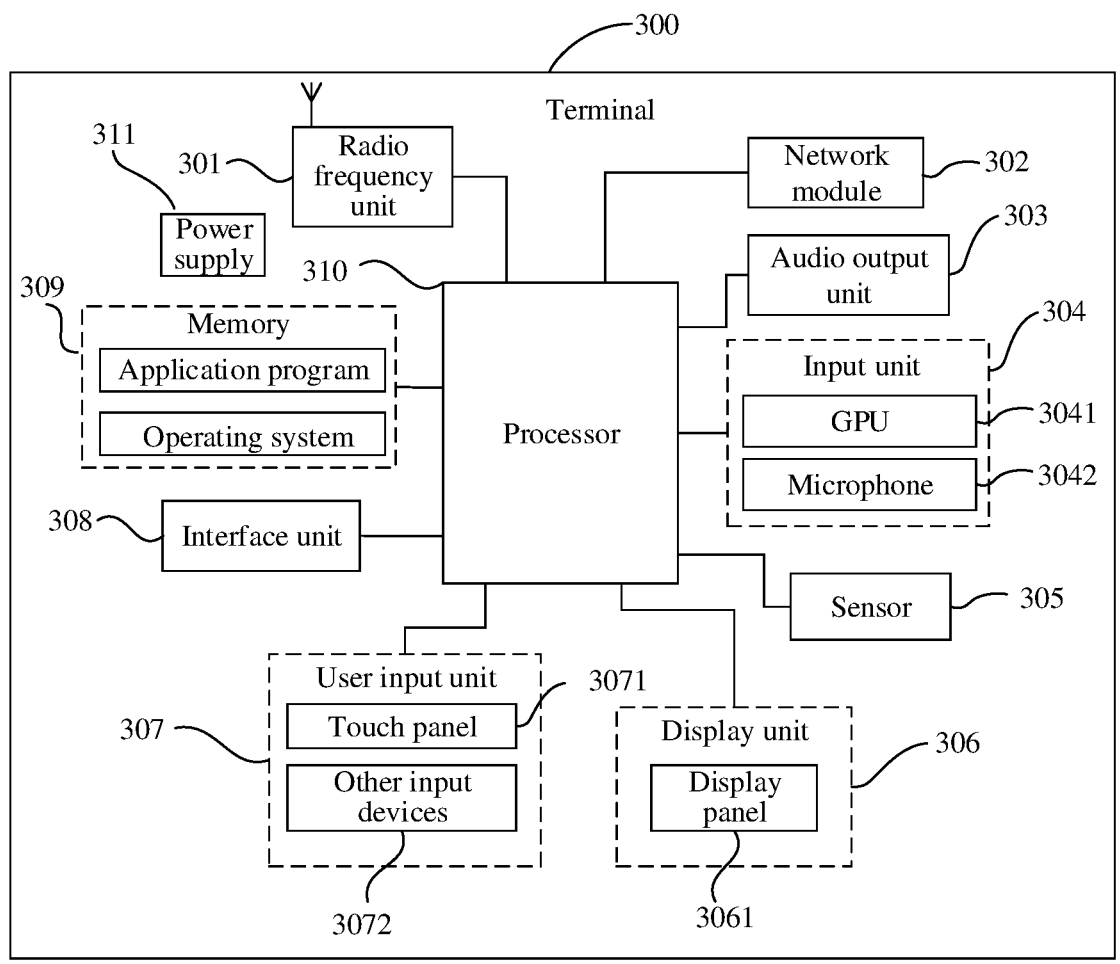
FIG. 3 is a second schematic structural diagram of a terminal according to an embodiment of the present disclosure.

Specifically, FIG. 3 is a schematic diagram of the hardware structure of a terminal that implements the embodiments of the present disclosure. A terminal 300 includes, but is not limited to: a radio frequency unit 301, a network module 302, an audio output unit 303, an input unit 304, a sensor 305, a display unit 306, a user input unit 307, an interface unit 308, a memory 309, a processor 310, and a power supply 311, among other components. It may be understood by a person skilled in the art that the terminal structure shown in FIG. 3 does not constitute a limitation on the terminal, and the terminal may include more or fewer components than those shown, or some components may be combined, or different component arrangements may be used. In the embodiments of the present disclosure, the terminal includes, but is not limited to, a mobile phone, a tablet computer, a notebook computer, a palmtop computer, an in-vehicle terminal, a wearable device, a pedometer and the like.

The processor 310 is configured to: acquire dedicated RRC information and/or system information, and perform a control operation on a CORESET and/or CSS according to information carried in the dedicated RRC information and/or system information, wherein the information is related to the CORESET and/or CSS.

In the terminal 300 according to the embodiment of the present disclosure, it is specified that a control operation is performed on a CORESET and/or CSS according to information carried in dedicated RRC information and/or system information, wherein the information is related to the CORESET and/or CSS, so that the terminal 300 can accurately find a corresponding CORESET and/or CSS to complete a corresponding communication procedure.

It should be understood that, in embodiments of the present disclosure, the radio frequency unit 301 may be configured to receive and transmit signals during receiving or transmitting information or a call, and specifically, receive downlink data from a base station to be processed by the processor 310. In addition, uplink data is transmitted to the base station. Generally, the radio frequency unit 301 includes, but is not limited to, an antenna, at least one amplifier, a transceiver, a coupler, a low noise amplifier, a duplexer, and the like. In addition, the radio frequency unit 301 can also communicate with a network and other devices through a wireless communication system.

The terminal provides a user with wireless broadband Internet access through the network module 302, for example, helps the user to receive and send emails, browse web pages, and access streaming media.

The audio output unit 303 may convert audio data received by the radio frequency unit 301 or the network module 302 or stored in a memory 309 into an audio signal and output the audio signal as sound. Moreover, the audio output unit 303 can also provide audio output (for example, call signal reception sound, and message reception sound) related to a specific function performed by the terminal 300. The audio output unit 303 includes a speaker, a buzzer, a receiver, and the like.

The input unit 304 is configured to receive an audio or video signal. The input unit 304 may include a graphics processing unit (GPU) 3041 and a microphone 3042, and the GPU 3041 processes image data of a still picture or video obtained by an image capturing device (such as a camera) in a video capturing mode or an image capturing mode. Processed image frames can be displayed on the display unit 306. The image frames processed by the GPU 3041 may be stored in the memory 309 (or other storage medium) or transmitted via the radio frequency unit 301 or the network module 302. The microphone 3042 can receive sound and can process such sound into audio data. In the case of a telephone call mode, the processed audio data can be converted into a format that can be transmitted to a mobile communication base station via the radio frequency unit 301 for output.

The terminal 300 further includes at least one sensor 305 such as a light sensor, motion sensor, and other sensors. Specifically, the light sensor includes an ambient light sensor and a proximity sensor. The ambient light sensor can adjust the brightness of the display panel 3061 according to the brightness of the ambient light, and the proximity sensor can turn off the display panel 3061 and/or backlight when the terminal 300 moves near the ear. As a kind of motion sensor, an accelerometer sensor can detect the magnitude of acceleration in a plurality of directions (usually three axes). While remaining still, the acceleration sensor may detect the magnitude and direction of gravity, which may be used in posture identification of the mobile terminal (e.g., switch between portrait and landscape modes, related games, magnetometer posture calibration), vibration identification related function (e.g., pedometer, knock) and the like. The sensor 305 may further include a fingerprint sensor, a pressure sensor, an iris sensor, a molecular sensor, a gyroscope, a barometer, a hygrometer, a thermometer, an infrared sensor, and the like. Details are not described herein.

The display unit 306 is configured to display information input by the user or information provided to the user. The display unit 306 may include a display panel 3061. The display panel 3061 may be configured in the form of a liquid-crystal display (LCD), an organic light-emitting diode (OLED) or the like.

The user input unit 307 may be configured to receive input numerical information or character information, and generate key signal inputs related to the user setting and function control of the mobile terminal. In specific, the user input unit 307 includes a touch panel 3071 and other input devices 3072. The touch panel 3071, also known as touch screen, may detect the touches thereon or in the vicinity thereof performed by the user (such as touch operations performed on or in the vicinity of the touch panel 3071 by the user using a finger, stylus or any other suitable object or accessory). The touch panel 3071 may include a touch detector and a touch controller. Wherein, the touch detector detects the position where the user touched and the signal resulting from the touch operation, and conveys the signal to the touch controller; the touch controller receives the touch information from the touch detector, converts the information into coordinates of the touch and conveys the coordinates to the processor 310, as well as receives and executes the commands from the processor 310. Further, the touch panel 3071 may be implemented in a variety of modes, such as resistance, capacitance, infrared and surface acoustic wave. In addition to the touch panel 3071, the user input unit 307 may include other input devices 3072. In specific, the other input devices 3072 may include, but is not limited to: physical keyboard, functional keys (such as volume button, switch button, etc.), track ball, mouse, joystick, which is not described in detail herein.

Further, the touch panel 3071 may overlie the display panel 3061. Having detected a touch operation thereon or in the vicinity thereof, the touch panel 3071 conveys the detected touch signal to the processor 310 to categorize the touch event, and the processor 310 provides corresponding visual output on the display panel 3061 in accordance with the category of the touch event. Although, in FIG. 3, the touch panel 3071 and the display panel 3061 are provided as two separate parts to implement the input and output function of the mobile terminal, the touch panel 3071 and the display panel 3061 may be integrated to implement the input and output function of the mobile terminal in some embodiments, which is not limited herein.

The interface unit 308 is an interface by which an external device is connected to the terminal 300. For example, the external device may include a wired or wireless headset port, an external power supply (or battery charger) port, a wired or wireless data port, a storage card port, a port configured to be connected to a device having an identification module, an audio input/output (I/O) port, a video I/O port, an earphone port and the like. The interface unit 308 may be configured to receive input (e.g., data information, power, etc.) from the external device and transfer the received input to one or more components in the terminal 300, or may be configured to transmit data between the terminal 300 and the external device.

The memory 309 may be configured to store software program and other data. The memory 309 may include generally a program storage area and a data storage area. The program storage area may store an operating system, an application program required for at least one function (such as an audio playing function and an image playback function) and the like; the data storage area may store data (e.g., audio data, phone book, etc.) created according to usage of a mobile phone, and the like. Moreover, the memory 309 may include a cache, as well as a non-volatile storage, such as at least one disk storage device, flash memory or other non-volatile solid-state storage devices.

The processor 310 is a control center of the mobile terminal. The processor 310 is connected to various parts of the entire mobile terminal through various interfaces and lines, and performs various functions of the mobile terminal and processes data by executing or running software programs and/or modules stored in the memory 309 and invoking data stored in the memory 309, so as to achieve an overall monitoring of the mobile terminal. The processor 310 may include one or more processing units; optionally, the processor 310 may integrate an application processor and a modem, wherein the application processor is mainly responsible for executing an operating system, a user interface, an application program, etc., while the modem is mainly responsible for handling wireless communication. It is understood, the modem may be not integrated in the processor 310.

The terminal 300 may further include a power supply 311 (e.g., a battery) providing power to various components. Optionally, the power supply 311 may be logically connected to the processor 310 via a power management system, such that functions such as charging management, discharging management and power management may be achieved through the power management system.

In addition, the terminal 300 may further include some functional modules not shown. Details are not described herein again.

An embodiment of the present disclosure further provides a computer-readable storage medium, where the computer-readable storage medium stores therein a computer program, and the computer program is configured to be executed by a processor to implement various processes of the embodiments of the foregoing control method, and can achieve the same technical effects. To avoid repetition, details are not described herein again. The computer-readable storage medium is, for example, a read-only memory (ROM), a random access memory (RAM), a magnetic disk, an optical disc or the like.

It should be noted that the terms "include", "comprise" or any variation thereof herein are intended to cover a non-exclusive inclusion, such that a process, a method, an article, or a device that includes a list of elements not only includes the list of elements, but also may include other elements not expressly listed or include elements inherent in the process, the method, the article, or the device. In case that there is no further limitation, an element preceded by "includes or including" does not preclude existence of additional identical elements in the process, the method, the article, or the device including the element.

From the foregoing description of the embodiments, a person skilled in the art will clearly appreciate that the method according to the embodiments may be implemented not only by software in conjunction with necessary generic hardware platform, but also by hardware, although the former will be preferred in most cases. Based on such an understanding, essential parts, or parts contributing to the related art, of the technical solution of the present disclosure may be implemented in form of a software product. The software product is stored in a storage medium (e.g., an ROM/RAM, a magnetic disk and an optical disc) and includes several instructions configured to be executed by a terminal (such as a handset, a computer, a server, an air conditioner or a network device) to perform the method according to the embodiments of the present disclosure.

The embodiments of the present disclosure are described above with reference to the accompanying drawings. However, the present disclosure is not limited to the foregoing specific implementations. The foregoing specific implementations are merely illustrative rather than limitative. In light of the teachings of the present disclosure, a person of ordinary skill in the art may further make various forms without departing from the spirit of the present disclosure and the scope of the claims, and these forms all fall within the scope of the present disclosure.

What is claimed is:

1. A control method, applied to a terminal, comprising:
acquiring dedicated radio resource control (RRC) message and system information; and
performing a control operation on a control resource set (CORESET) and/or common search space (CSS) according to information carried in the dedicated RRC message and/or system information,
wherein the information is related to the CORESET and/or CSS;
wherein the dedicated RRC message corresponds to a target communication procedure, the target communication procedure comprising at least one of: a secondary cell group change procedure or a secondary cell group addition procedure;
wherein,
in case that the dedicated RRC message does not include the configuration information used for indicating the CORESET and/or CSS, the performing the control operation on the CORESET and/or CSS comprises at least one of following steps:
selecting a CORESET #0 indicated in the system information;
selecting a CSS #0 indicated in the dedicated RRC message.

2. The control method according to claim 1, wherein the system information carries CORESET information and/or CSS information;
the performing the control operation on the CORESET and/or CSS comprises at least one of following steps:
selecting a CORESET #0 indicated in the system information;
selecting a CSS #0 indicated in the system information;
selecting a CSS associated with a CORESET #0 indicated in the system information.

3. The control method according to claim 1, wherein the system information comprises a master information block (MIB) and a system information block 1 (SIB1), the MIB carries CORESET information and/or CSS information, and the SIB1 carries CORESET information and/or CSS information;

the performing the control operation on the CORESET and/or CSS comprises at least one of following steps:
ignoring the CORESET information carried in the SIB1;
ignoring the CSS information carried in the SIB1;
ignoring the CORESET information carried in the MIB;
ignoring the CSS information carried in the MIB.

4. The control method according to claim 3, wherein the CORESET information and/or CSS information is carried explicitly.

5. The control method according to claim 3, wherein the CORESET information and/or CSS information is carried implicitly.

6. The control method according to claim 1, wherein the dedicated RRC message carries CORESET information and/or CSS information, and the system information carries CORESET information and/or CSS information;
the performing the control operation on the CORESET and/or CSS comprises at least one of following steps:
ignoring the CORESET information carried in the dedicated RRC message;
ignoring the CSS information carried in the dedicated RRC message;
ignoring the CORESET information carried in the system information;
ignoring the CSS information carried in the system information.

7. The control method according to claim 6, wherein the CORESET information and/or CSS information is carried explicitly.

8. The control method according to claim 6, wherein the CORESET information and/or CSS information is carried implicitly.

9. A non-transitory computer-readable storage medium, storing therein a computer program, wherein the computer program is configured to be executed by a processor to implement the steps in the control method according to claim 1.

10. The control method according to claim 1, wherein,
in case that the dedicated RRC message includes configuration information used for indicating a CORESET and/or CSS, the performing the control operation on the CORESET and/or CSS comprises at least one of following steps:
selecting a CORESET indicated in the dedicated RRC message;
selecting a CSS indicated in the dedicated RRC message.

11. A terminal, comprising a memory, a processor, and a computer program stored in the memory and configured to be executed by the processor, wherein the processor is configured to execute the computer program to implement following steps:
acquiring dedicated radio resource control (RRC) message and system information; and
performing a control operation on a control resource set (CORESET) and/or common search space (CSS) according to information carried in the dedicated RRC message and/or system information,
wherein the information is related to the CORESET and/or CSS;
wherein the dedicated RRC message corresponds to a target communication procedure, the target communication procedure comprising at least one of: a secondary cell group change procedure or a secondary cell group addition procedure;
wherein,
in case that the dedicated RRC message does not include the configuration information used for indicating the CORESET and/or CSS, the processor is further configured to execute the computer program to implement at least one of following steps:
selecting a CORESET #0 indicated in the system information;
selecting a CSS #0 indicated in the dedicated RRC message.

12. The terminal according to claim 11, wherein the system information carries CORESET information and/or CSS information;
the processor is further configured to execute the computer program to implement at least one of following steps:
selecting a CORESET #0 indicated in the system information;
selecting a CSS #0 indicated in the system information;
selecting a CSS associated with a CORESET #0 indicated in the system information.

13. The terminal according to claim 11, wherein the system information comprises a master information block (MIB) and a system information block 1 (SIB1), the MIB carries CORESET information and/or CSS information, and the SIB1 carries CORESET information and/or CSS information;
the processor is further configured to execute the computer program to implement at least one of following steps:
ignoring the CORESET information carried in the SIB1;
ignoring the CSS information carried in the SIB1;
ignoring the CORESET information carried in the MIB;
ignoring the CSS information carried in the MIB.

14. The terminal according to claim 13, wherein the CORESET information and/or CSS information is carried explicitly.

15. The terminal according to claim 13, wherein the CORESET information and/or CSS information is carried implicitly.

16. The terminal according to claim 11, wherein the dedicated RRC message carries CORESET information and/or CSS information, and the system information carries CORESET information and/or CSS information;
the processor is further configured to execute the computer program to implement at least one of following steps:
ignoring the CORESET information carried in the dedicated RRC message;
ignoring the CSS information carried in the dedicated RRC message;
ignoring the CORESET information carried in the system information;
ignoring the CSS information carried in the system information.

17. The terminal according to claim 11, wherein,
in case that the dedicated RRC message includes configuration information used for indicating a CORESET and/or CSS, the performing the control operation on the CORESET and/or CSS comprises at least one of following steps:
selecting a CORESET indicated in the dedicated RRC message;
selecting a CSS indicated in the dedicated RRC message.

* * * * *